United States Patent
Kojima

(10) Patent No.: US 9,927,133 B2
(45) Date of Patent: Mar. 27, 2018

(54) AIR CONDITIONING SYSTEM

(71) Applicant: DAIKIN INDUSTRIES, LTD., Osaka-shi, Osaka (JP)

(72) Inventor: Akiharu Kojima, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/115,223

(22) PCT Filed: Jan. 27, 2015

(86) PCT No.: PCT/JP2015/052153
§ 371 (c)(1),
(2) Date: Jul. 28, 2016

(87) PCT Pub. No.: WO2015/115404
PCT Pub. Date: Aug. 6, 2015

(65) Prior Publication Data
US 2016/0341434 A1    Nov. 24, 2016

(30) Foreign Application Priority Data

Feb. 3, 2014    (JP) .................................. 2014-018778

(51) Int. Cl.
*F24D 12/02*    (2006.01)
*F24D 5/12*    (2006.01)
(Continued)

(52) U.S. Cl.
CPC ......... *F24D 19/1087* (2013.01); *F24D 12/02* (2013.01); *F24D 15/02* (2013.01);
(Continued)

(58) Field of Classification Search
CPC ...... F24D 19/1087; F24D 12/02; F24D 15/04; F24D 2200/32; F24F 3/001; F24F 11/085;
(Continued)

(56) References Cited

U.S. PATENT DOCUMENTS 3,173,476 A    3/1965 McCready
3,996,998 A    12/1976 Garst et al.
(Continued)

FOREIGN PATENT DOCUMENTS

EP    0 098 787 A2    1/1984
JP    62-56730 A    3/1987
(Continued)

OTHER PUBLICATIONS

International Search Report of corresponding PCT Application No. PCT/JP2015/052153 dated Apr. 21, 2015.
(Continued)

*Primary Examiner* — Gregory Huson
*Assistant Examiner* — Daniel E Namay

(57) ABSTRACT

An air conditioning system includes a heat pump section performing indoor air-warming by using a vapor-compression refrigeration cycle, a separate heat source section performing indoor air-warming by using a heat source separate from the heat pump section, and a control unit configured to control actions of the heat pump section and the separate heat source section. When a heat pump air-warming operation is being performed, and when a first switching condition is met, the control unit switches from the heat pump air-warming operation to a separate heat source air-warming operation. The first switching condition is that an outside air temperature reaches a first switching outside air temperature and an air-warming capability of the heat pump section reaches an upper limit.

8 Claims, 12 Drawing Sheets

(51) Int. Cl.
   *F24D 19/10* (2006.01)
   *F24D 15/04* (2006.01)
   *F24F 3/00* (2006.01)
   *F24F 11/00* (2018.01)
   *F24D 15/02* (2006.01)
   *F24F 11/08* (2006.01)

(52) U.S. Cl.
   CPC .............. *F24D 15/04* (2013.01); *F24F 3/001* (2013.01); *F24F 11/006* (2013.01); *F24D 2200/04* (2013.01); *F24D 2200/123* (2013.01); *F24D 2200/32* (2013.01); *F24F 2011/0013* (2013.01); *F24F 2011/0016* (2013.01); *F24F 2011/0064* (2013.01); *Y02B 30/12* (2013.01); *Y02B 30/123* (2013.01); *Y02B 30/14* (2013.01)

(58) Field of Classification Search
   CPC ....... F24F 2011/0013; F24F 2011/0016; F24F 2011/0064; Y02B 30/14; Y02B 30/52; Y02B 30/123; F23N 2041/02; F23N 2037/00; F25B 5/005; F25B 5/12
   USPC ....... 237/2 B, 2 A, 81; 62/79, 337; 236/15 R
   IPC .................. F24D 19/10,12/02, 15/04, 15/12
   See application file for complete search history.

(56) References Cited

U.S. PATENT DOCUMENTS

| | | | |
|---|---|---|---|
| 4,143,707 A | 3/1979 | Lewis et al. | |
| 4,217,761 A * | 8/1980 | Cornaire | G01K 17/08 165/11.1 |
| 4,445,567 A | 5/1984 | Nelson | |
| 4,716,957 A * | 1/1988 | Thompson | F24F 3/001 165/11.1 |
| 6,176,306 B1 * | 1/2001 | Gault | F24D 19/1087 165/240 |
| 6,729,390 B1 * | 5/2004 | Toth | F24D 12/02 165/240 |
| 7,380,588 B2 * | 6/2008 | Helt | F24D 12/02 165/240 |
| 9,632,490 B2 * | 4/2017 | Grohman | G05B 15/02 |
| 9,651,268 B2 * | 5/2017 | Branson | F24D 19/1087 |
| 2005/0150650 A1 * | 7/2005 | Helt | F24D 12/02 165/240 |
| 2010/0090017 A1 * | 4/2010 | Naghshineh | F24H 9/2085 237/2 B |
| 2012/0248212 A1 | 10/2012 | Storm et al. | |
| 2013/0066472 A1 | 3/2013 | Harrod et al. | |

FOREIGN PATENT DOCUMENTS

| | | | | |
|---|---|---|---|---|
| JP | 64-54160 A | | 3/1989 | |
| JP | 2015068607 A | * | 4/2015 | ......... F24D 19/1087 |
| JP | 5858062 B2 | | 12/2015 | |

OTHER PUBLICATIONS

International Preliminary Report of corresponding PCT Application No. PCT/JP2015/052153 dated Aug. 18, 2016.
European Search Report of corresponding EP Application No. 15 74 3681.7 dated Mar. 2, 2017.

* cited by examiner

AIR CONDITIONING SYSTEM

CROSS-REFERENCE TO RELATED APPLICATIONS

This U.S. National stage application claims priority under 35 U.S.C. § 119(a) to Japanese Patent Application No. 2014-018778, filed in Japan on Feb. 3, 2014, the entire contents of which are hereby incorporated herein by reference.

TECHNICAL FIELD

The present invention relates to an air conditioning system, and particularly relates to an air conditioning system having a heat pump section for performing indoor air-warming by using a vapor-compression refrigeration cycle, and a separate heat source section for performing indoor air-warming by using a heat source separate from the heat pump section.

BACKGROUND ART

In the past, there have been air conditioning systems which have a heat pump section for performing indoor air-warming by using a vapor-compression refrigeration cycle, and a separate heat source section for performing indoor air-warming by using a gas furnace which is a heat source separate from the heat pump section. An example of such an air conditioning system is one in which an air-warming operation by the heat pump section (referred to below as the "heat pump air-warming operation") is switched to an air-warming operation by the separate heat source section (referred to below as the "separate heat source air-warming operation") as an outside air temperature drops, and the separate heat source air-warming operation is switched to the heat pump air-warming operation as the outside air temperature rises, as is indicated in Japanese Laid-open Patent Application No. 64-54160.

SUMMARY

With the method of switching from the heat pump air-warming operation to the separate heat source air-warming operation in the aforementioned Japanese Laid-open Patent Application No. 64-54160, there is a risk that the switch from the heat pump air-warming operation to the separate heat source air-warming operation will be slow and an indoor temperature will drop when the indoor air-conditioning load (air-warming load) is large, and there is a risk that the switch from the heat pump air-warming operation to the separate heat source air-warming operation will be fast and an energy conservation will be impaired when the indoor air-conditioning load (air-warming load) is small. By contrast, it is conceivable to appropriately set the outside air temperature at which the operation will be switched from the heat pump air-warming operation to the separate heat source air-warming operation in accordance with factors such as the installation conditions of the air conditioning system, but this setting would not be easy and the working man-hours would increase.

An object of the present invention is to make the switch timing appropriate and improve the comfort level and the energy conservation when the operation is switched from the heat pump air-warming operation to the separate heat source air-warming operation in an air conditioning system comprising the heat pump section and the separate heat source section.

An air conditioning system according to a first aspect has a heat pump section for performing indoor air-warming by using a vapor-compression refrigeration cycle, a separate heat source section for performing indoor air-warming by using a heat source separate from the heat pump section, and a control unit for controlling actions of the heat pump section and the separate heat source section. In this aspect, when a heat pump air-warming operation is being performed in which indoor air-warming is performed by the heat pump section, and when a first switching condition is met, which is that an outside air temperature reaches a first switching outside air temperature and an air-warming capability of the heat pump section reaches an upper limit, the control unit switches from the heat pump air-warming operation to a separate heat source air-warming operation in which indoor air-warming is performed by the separate heat source section.

In this aspect, when the operation switches from the heat pump air-warming operation to the separate heat source air-warming operation as described above, it is possible to take into account not only the outside air temperature, but also whether or not the air-warming capability of the heat pump section has reached an upper limit.

It is thereby possible in this aspect for the switch from the heat pump air-warming operation to the separate heat source air-warming operation to be made at an appropriate timing, and for the comfort level and energy conservation to be improved.

An air conditioning system according to a second aspect is the air conditioning system according to the first aspect, wherein the control unit decides a second switching outside air temperature as a second switching condition for switching from the separate heat source air-warming operation to the heat pump air-warming operation, on the basis of the outside air temperature when an operation is switched from the heat pump air-warming operation to the separate heat source air-warming operation.

In this aspect, the second switching outside air temperature used to switch from the separate heat source air-warming operation to the heat pump air-warming operation can be decided on the basis of the outside air temperature that takes into account whether or not the air-warming capability of the heat pump section has reached the upper limit, and can be used when the operation is switched from the separate heat source air-warming operation to the heat pump air-warming operation.

It is thereby possible in this aspect for the switch from the separate heat source air-warming operation to the heat pump air-warming operation to be made at an appropriate timing, and for the comfort level and the energy conservation to be improved.

An air conditioning system according to a third aspect is the air conditioning system according to the first or second aspect, wherein the control unit stores the outside air temperature used when the operation is switched from the heat pump air-warming operation to the separate heat source air-warming operation, updates the first switching outside air temperature, and uses the updated first switching outside air temperature when next determining whether or not the first switching condition is met.

In this aspect, the first switching outside air temperature used to switch from the heat pump air-warming operation to the separate heat source air-warming operation can be updated to the outside air temperature that takes into account whether or not the air-warming capability of the heat pump section has reached the upper limit, and the updated first switching outside air temperature can be used in the next switch from the heat pump air-warming operation to the separate heat source air-warming operation.

It is thereby possible in this aspect for the first switching outside air temperature used in the switch from the heat pump air-warming operation to the separate heat source air-warming operation to be set to an appropriate value which takes into account the installation conditions and/or operating circumstances of the air conditioning system.

An air conditioning system according to a fourth aspect is the air conditioning system according to any of the first through third aspects, wherein the control unit determines that the air-warming capability of the heat pump section has reached the upper limit when a temperature difference resulting from subtracting a target indoor temperature from an indoor temperature is equal to or greater than a first switching indoor temperature difference and an operating capacity of a device configuring the heat pump section has reached an upper limit.

In this aspect, whether or not the air-warming capability of the heat pump section has reached the upper limit is determined on the basis of the indoor temperature and the operating capacity of the device configuring the heat pump section, as described above.

It is thereby possible in this aspect to appropriately determine whether or not the air-warming capability of the heat pump section has reached the upper limit.

An air conditioning system according to a fifth aspect is the air conditioning system according to the first through fourth aspects, wherein the control unit determines that the first switching condition is met also when the outside air temperature has reached the first switching outside air temperature and a coefficient of performance of the heat pump section has reached a lower limit.

In this aspect, whether or not the coefficient of performance of the heat pump section has reached the lower limit can also be taken into account when the operation is switched from the heat pump air-warming operation to the separate heat source air-warming operation, as described above.

It is thereby possible in this aspect for the switch from the heat pump air-warming operation to the separate heat source air-warming operation to be made at a timing that takes the operating efficiency of the heat pump section into account.

DESCRIPTION OF EMBODIMENTS

An embodiment of an air conditioning system according to the present invention is described below on the basis of the drawings. The specific configuration of the embodiment of the air conditioning system according to the present invention is not limited to the following embodiment or the modifications thereof, and the configuration can be altered within a range that does not deviate from the scope of the invention.

(1) Configuration of Air Conditioning System

<Overall>

Figure 1:
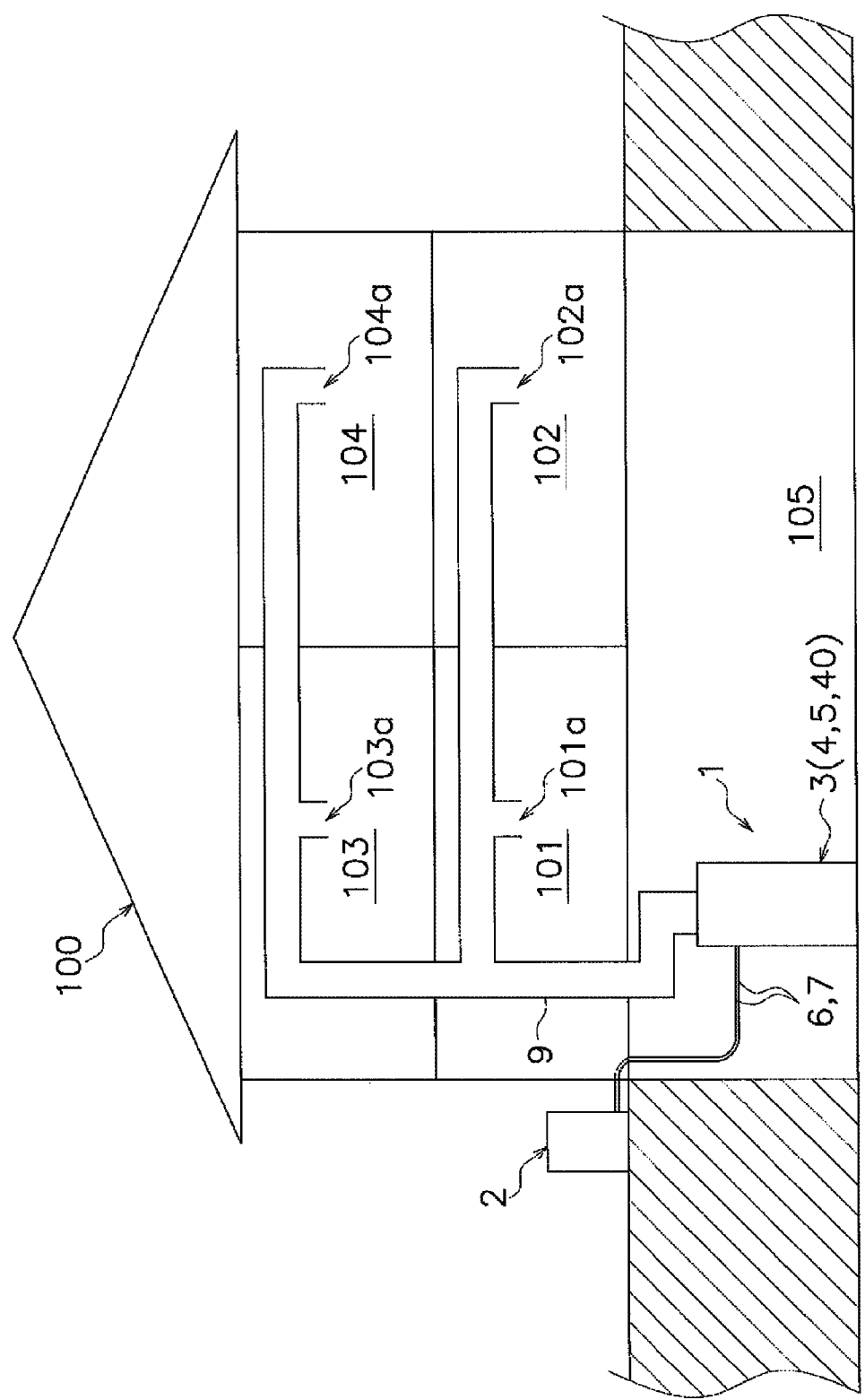
FIG. 1 is a schematic diagram showing the arrangement of an air conditioning system according to an embodiment of the present invention.
Figure 2:
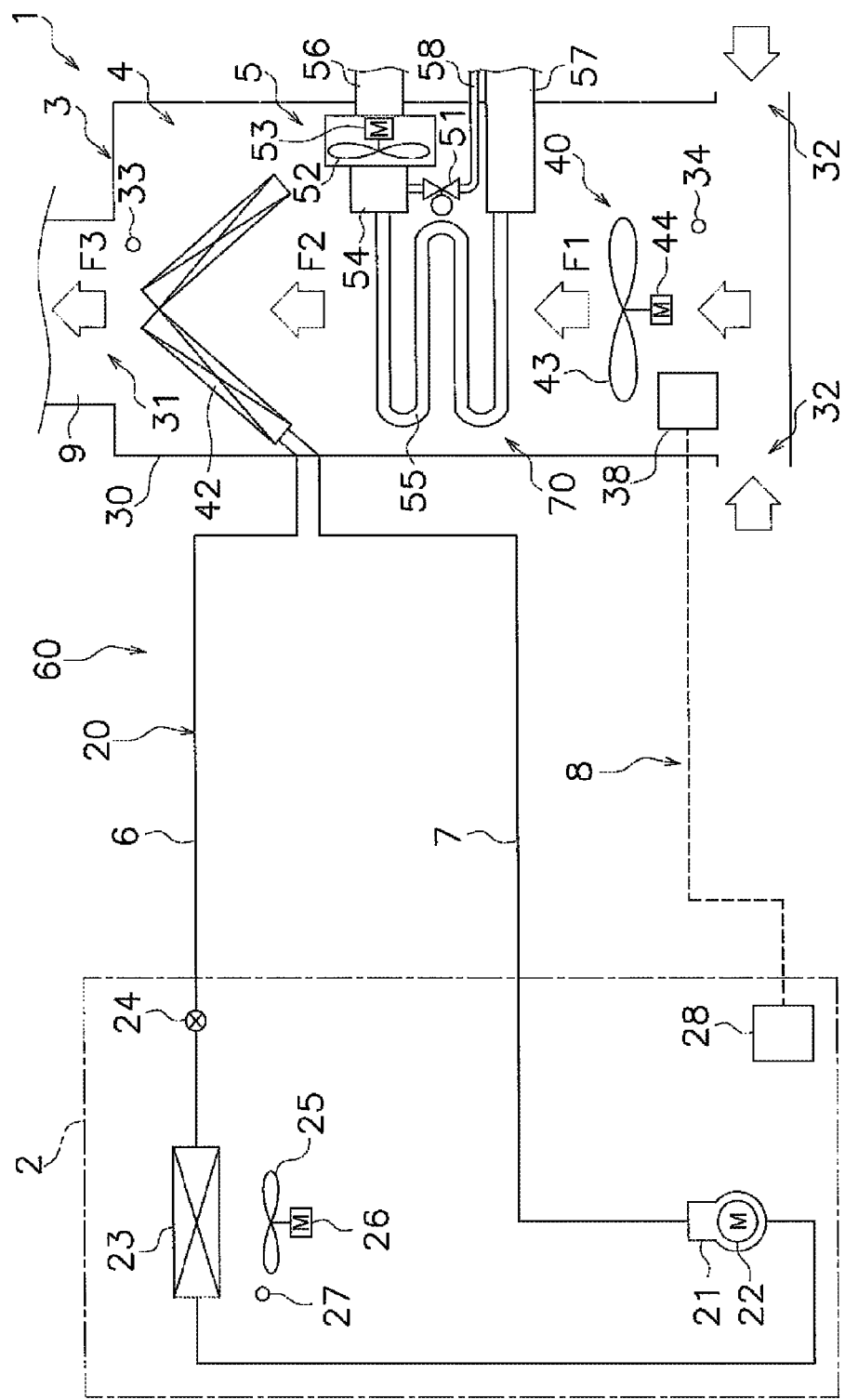
FIG. 2 is a simplified configuration diagram of the air conditioning system.

FIG. 1 is a schematic diagram showing the arrangement of an air conditioning system 1 according to an embodiment of the present invention. FIG. 2 is a simplified schematic diagram of the air conditioning system 1. The air conditioning system 1 is an apparatus used to air-condition a residence or a building. The air conditioning system 1 in this embodiment is installed in a two-story residence 100. The residence 100 has rooms 101, 102 on the first floor and rooms 103, 104 on the second floor. The residence 100 also has a basement 105.

The air conditioning system 1 is a so-called duct-type air conditioning system. The air conditioning system 1 has primarily an outdoor unit 2, a usage unit 3, refrigerant interconnection pipes 6, 7 connecting the outdoor unit 2 and the usage unit 3, and a duct 9 for sending air conditioned by the usage unit 3 to the rooms 101 to 104. The duct 9 is branched into the rooms 101 to 104 and is connected to ventilation ports 101a to 104a of the rooms 101 to 104.

In this embodiment, the outdoor unit 2, an indoor unit 4 which is part of the usage unit 3, and the refrigerant interconnection pipes 6, 7 configure a heat pump section 60 for performing indoor air-warming using by a vapor-compression refrigeration cycle. A gas furnace unit 5, which is part of the usage unit 3, configures a separate heat source section 70 for performing indoor air-warming using by a heat source (heat from gas combustion in this embodiment) separate from the heat pump section 60. Thus, in this embodiment, the usage unit 3 has both the indoor unit 4 configuring the heat pump section 60 and the gas furnace unit 5 configuring the separate heat source section 70. The usage unit 3 also has an indoor air blower 40 for taking the air in the rooms 101 to 104 into a housing 30 of the usage unit 3, and supplying air conditioned by the heat pump section 60 (the indoor unit 4) and/or the separate heat source section 70 (the gas furnace unit 5) to the rooms 101 to 104. The usage unit 3 is also provided with a discharged air temperature sensor 33 for detecting a discharged air temperature Trd, which is the temperature of the air in an air outlet 31 of the housing 30, and an indoor temperature sensor 34 for detecting indoor temperature Tr, which is the temperature of the air in an air inlet 32 of the housing 30. The indoor temperature sensor 34 may be provided within the rooms 101 to 104 rather than in the usage unit 3.

<Heat Pump Section>

The heat pump section 60, as described above, is configured from the outdoor unit 2, the indoor unit 4 which is part of the usage unit 3, and the refrigerant interconnection pipes 6, 7. In this embodiment, the outdoor unit 2 and the indoor unit 4 are connected via the refrigerant interconnection pipes 6, 7. Specifically, in the heat pump section 60, a refrigerant circuit 20 is configured by the outdoor unit 2 and the indoor unit 4 being connected via the refrigerant interconnection pipes 6, 7. In this embodiment, the refrigerant interconnection pipes 6, 7 are refrigerant pipes constructed on-site when the air conditioning system 1 is installed.

The indoor unit 4 in this embodiment is provided inside the housing 30 of the usage unit 3 installed in the basement 105 of the residence 100. The indoor unit 4, which is connected to the outdoor unit 2 via the refrigerant interconnection pipes 6, 7, constitutes part of the refrigerant circuit 20. The indoor unit 4 has primarily an indoor heat exchanger 42 as a refrigerant heat-radiator for heating air by radiating the heat of the refrigerant in the refrigeration cycle. In this embodiment, the indoor heat exchanger 42 is disposed on the farthest downwind side in the ventilation path from the air inlet 32 to the air outlet 31 formed in the housing 30 of the usage unit 3.

The outdoor unit 2 is installed outside of the residence 100. The outdoor unit 2, which is connected to the indoor unit 4 via the refrigerant interconnection pipes 6, 7, configures part of the refrigerant circuit 20. The outdoor unit 2 has primarily a compressor 21, an outdoor heat exchanger 23, and an outdoor expansion valve 24. The compressor 21 is a hermetic compressor in which a compression element (not shown) and a compressor motor 22 for rotatably driving the compression element are accommodated within a casing. The compressor motor 22 is designed so that electric power is supplied via an inverter device (not shown), and the operating capacity can be varied by changing the frequency (i.e., the rotational speed) of the inverter device. The outdoor heat exchanger 23 is a heat exchanger that functions as a refrigerant evaporator which uses outdoor air to evaporate refrigerant in the refrigerant cycle. Provided in proximity to the outdoor heat exchanger 23 is an outdoor fan 25 for sending outdoor air to the outdoor heat exchanger 23. The outdoor fan 25 is designed so as to be rotatably driven by an outdoor fan motor 26. The outdoor expansion valve 24 is a valve which depressurizes the refrigerant circulating through the refrigerant circuit 20, and adjusts the flow rate of refrigerant flowing through the indoor heat exchanger 42 as a refrigerant heat-radiator. In this embodiment, the outdoor expansion valve 24 is an electric expansion valve connected to the liquid side of the outdoor heat exchanger 23. The outdoor unit 2 is also provided with an outdoor temperature sensor 27 for detecting the temperature of outdoor air outside of the residence 100 where the outdoor unit 2 is disposed, i.e., the outside air temperature Ta. The outdoor unit 2 also has an outdoor-side control unit 28 for controlling the actions of the components configuring the outdoor unit 2. The outdoor-side control unit 28, which has a microcomputer provided in order to control the outdoor unit 2, an inverter device which controls a memory and/or the compressor motor 22, and other components, is designed to be able to exchange control signals and the like with a usage-side control unit 38 of the usage unit 3.

<Separate Heat Source Section>

The separate heat source section 70, as described above, is configured from the gas furnace unit 5 which is part of the usage unit 3.

The gas furnace unit 5 in this embodiment is provided within the housing 30 of the usage unit 3 disposed in the basement 105 of the residence 100. In this embodiment, the gas furnace unit 5 is a gas combustion type air-warming apparatus, having primarily a fuel gas valve 51, a furnace fan 52, a combustion section 54, a furnace heat exchanger 55, an air-feeding pipe 56, and an exhaust pipe 57. The fuel gas valve 51, composed of an electromagnetic valve or the like of which the opening and closing can be controlled, is provided to a fuel gas supply pipe 58 extending to the combustion section 54 from outside of the housing 30. In this embodiment, natural gas, petroleum gas, or the like is used as the fuel gas. The furnace fan 52 is a fan which takes air into the combustion section 54 through the air-feeding pipe 56, then sends the air to the furnace heat exchanger 55, and creates an air flow which is discharged from the exhaust pipe 57. The furnace fan 52 is designed so as to be rotatably driven by a furnace fan motor 53. The combustion section 54 is a device which obtains high-temperature combustion gas, by combustion of a mixed gas of fuel gas and air by using a gas burner or the like (not shown). The furnace heat exchanger 55, which is a heat exchanger for heating air by radiating the heat of the combustion gas obtained by the combustion section 54, functions as a separate heat source heat-radiator for heating air by radiating the heat of a heat source (heat from gas combustion in this embodiment) that is separate from the heat pump section 60. In this embodiment, the furnace heat exchanger 55 is disposed within the ventilation path from the air inlet 32 to the air outlet 31 formed in the housing 30 of the usage unit 3, on the side upwind from the indoor heat exchanger 42 as a refrigerant heat-radiator.

<Indoor Air Blower>

The indoor air blower 40, as described above, is an air blower for supplying the rooms 101 to 104 with air heated by the indoor heat exchanger 42 as a refrigerant heat-radiator configuring the heat pump section 60, and/or by the furnace heat exchanger 55 as a separate heat source heat-radiator configuring the separate heat source section 70. In this embodiment, the indoor air blower 40 is disposed within the ventilation path from the air inlet 32 to the air outlet 31 formed in the housing 30 of the usage unit 3, on the side upwind from both the indoor heat exchanger 42 and the furnace heat exchanger 55. The indoor air blower 40 has an indoor fan 43 and an indoor fan motor 44 for rotatably driving the indoor fan 43.

<Control Unit>

The usage unit 3 has the usage-side control unit 38 for controlling the actions of the components (the indoor unit 4, the gas furnace unit 5, and the indoor air blower 40) configuring the usage unit 3. The usage-side control unit 38 has a microcomputer, a memory, and other components provided in order to control the usage unit 3, and this control unit is designed to be able to exchange control signals and the like with the outdoor unit 2.

Figure 3:
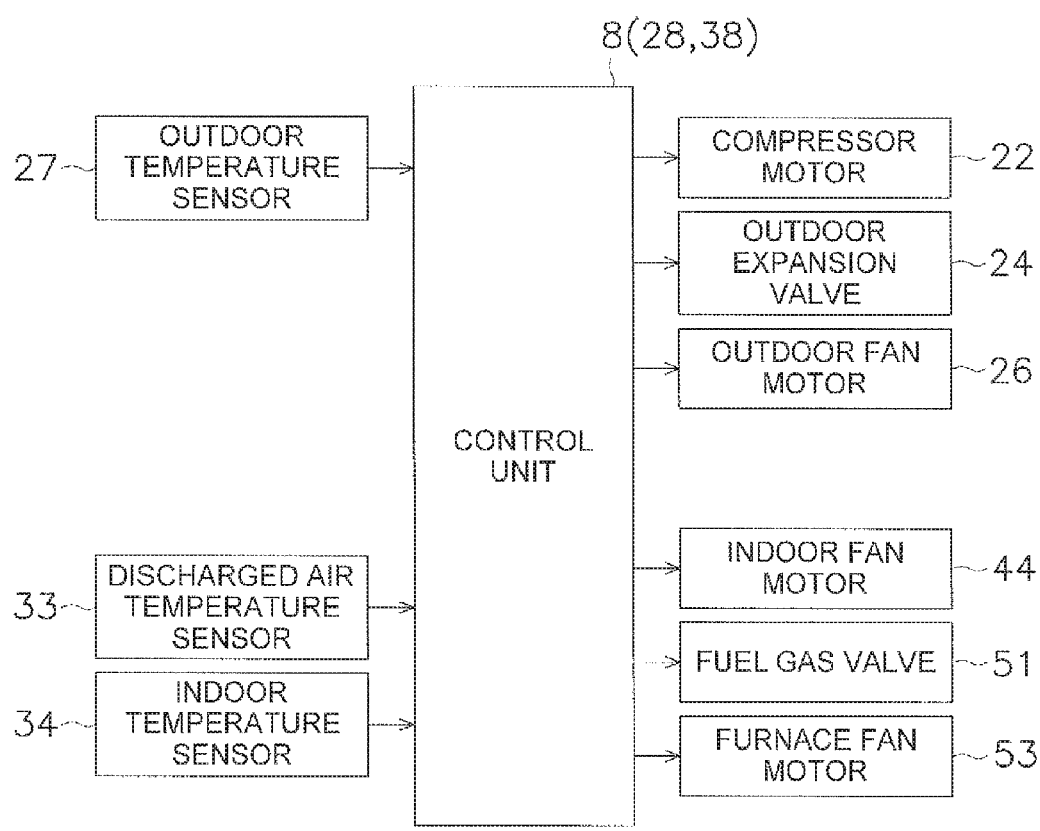
FIG. 3 is a control block diagram of the air conditioning system.

The usage-side control unit 38 of the usage unit 3 and the outdoor-side control unit 28 of the outdoor unit 2 configure a control unit 8 for performing operation control on the entire air conditioning system 1, as shown in FIG. 2. The control unit 8 is connected so as to be able to receive detection signals from the various sensors 27, 33, 34, etc., as shown in FIG. 3. The control unit 8 is configured so as to perform an air-conditioning operation (an air-warming operation) by controlling the various devices and valves 22, 24, 26, 44, 51, 53, i.e., by controlling the actions of the heat pump section 60 and the separate heat source section 70, on the basis of these detection signals and the like. In this embodiment, the control unit 8 performs control so that the indoor temperature Tr in the rooms 101 to 104 reaches a target indoor temperature Trs, while switching as appropriate between a heat pump air-warming operation in which air-warming in the rooms 101 to 104 is performed by the heat pump section 60, and a separate heat source air-warming operation in which air-warming in the rooms 101 to 104 is performed by the separate heat source section 70. FIG. 3 in this case is a control block diagram of the air conditioning system 1.

(2) Basic Actions of Air Conditioning System

Next, FIGS. 1 to 3 are used to describe the basic actions of the air-conditioning operation (the air-warming operation) of the air conditioning system 1. As described above, the air-warming operation of the air conditioning system 1 includes a heat pump air-warming operation in which indoor air-warming is performed by the heat pump section 60, and a separate heat source air-warming operation in which indoor air-warming is performed by the separate heat source section 70, as described above.

<Heat Pump Air-Warming Operation>

In the heat pump air-warming operation, the refrigerant in the refrigerant circuit 20 is drawn into the compressor 21 and compressed to a high-pressure gas refrigerant. This high-pressure gas refrigerant is sent from the outdoor unit 2 to the indoor unit 4 of the usage unit 3, via the gas refrigerant interconnection pipe 7.

The high-pressure gas refrigerant sent to the indoor unit 4 of the usage unit 3 is sent to the indoor heat exchanger 42 as a refrigerant heat-radiator. The high-pressure gas refrigerant sent to the indoor heat exchanger 42 is condensed to a high-pressure liquid refrigerant in the indoor heat exchanger 42 by being cooled by heat exchange with indoor air F1 (F2) supplied by the indoor air blower 40. This high-pressure liquid refrigerant is sent from the indoor unit 4 of the usage unit 3 to the outdoor unit 2, via the liquid refrigerant interconnection pipe 6, indoor air F3 heated in the indoor heat exchanger 42 is sent from the usage unit 3 through the duct 9 to the rooms 101 to 104, and air-warming is performed.

The high-pressure liquid refrigerant sent to the outdoor unit 2 is sent to the outdoor expansion valve 24 and is depressurized by the outdoor expansion valve 24 to a low-pressure gas-liquid two-phase refrigerant. This low-pressure gas-liquid two-phase refrigerant is sent to the outdoor heat exchanger 23 as a refrigerant evaporator. The low-pressure gas-liquid two-phase refrigerant sent to the outdoor heat exchanger 23 is evaporated to a low-pressure gas refrigerant in the outdoor heat exchanger 23 by being heated by heat exchange with outdoor air supplied by the outdoor fan 25. This low-pressure gas refrigerant is again drawn into the compressor 21.

In the heat pump air-warming operation described above, the control unit 8 performs control so that the indoor temperature Tr in the rooms 101 to 104 reaches the target indoor temperature Trs, either by controlling the operating capacity Gr of the compressor 21 or by controlling the opening degree MV of the outdoor expansion valve 24. Specifically, when a temperature difference $\Delta$Tr, which is resulting from subtracting the target indoor temperature Trs from the indoor temperature Tr, is large, the operating capacity Gr of the compressor 21 (e.g., the rotational speed of the compressor motor 22) is increased and the opening degree MV of the outdoor expansion valve 24 is increased. Specifically the control unit 8 performs control which increases the operating capacity Gr of the compressor 21 and increases the opening degree MV of the outdoor expansion valve 24 when the temperature difference $\Delta$Tr, which is resulting from subtracting the target indoor temperature Trs from the indoor temperature Tr, is large, and reduces the operating capacity Gr of the compressor 21 and reduces the opening degree MV of the outdoor expansion valve 24 when the temperature difference $\Delta$Tr is small.

<Separate Heat Source Air-Warming Operation>

In the separate heat source air-warming operation, fuel gas is supplied to the combustion section 54 by opening the fuel gas valve 51, the fuel gas in the combustion section 54 mixes with air taken into the gas furnace unit 5 of the usage unit 3 via the air-feeding pipe 56 by the furnace fan 52, the fuel gas ignites and thereby combusts, and a high-temperature combustion gas is produced.

The high-temperature combustion gas produced in the combustion section 54 is sent to the furnace heat exchanger 55 as a separate heat source heat-radiator. The high-temperature combustion gas sent to the furnace heat exchanger 55 is cooled to a low-temperature combustion gas in the furnace heat exchanger 55 by heat exchange with the indoor air F1 supplied by the indoor air blower 40. This low-temperature combustion gas is discharged from the gas furnace unit 5 of the usage unit 3 via the exhaust pipe 57. On the other hand, the indoor air F2 (F3) heated in the furnace heat exchanger 55 is sent from the usage unit 3 through the duct 9 to the rooms 101 to 104, and air-warming is performed.

In the separate heat source air-warming operation described above, the control unit 8 performs control so that the indoor temperature Tr in the rooms 101 to 104 reaches the target indoor temperature Trs, by controlling the opening and closing of the fuel gas valve 51. Specifically, the control unit 8 performs control which opens the fuel gas valve 51 when the temperature difference $\Delta$Tr, which is resulting from subtracting the target indoor temperature Trs from the indoor temperature Tr, increases, and closes the fuel gas valve 51 when the temperature difference $\Delta$Tr decreases.

(3) Action of Switching Between Heat Pump Air-Warming Operation and Separate Heat Source Air-Warming Operation In the air conditioning system 1, there are cases in which the air-conditioning load (the air-warming load) in the rooms (the rooms 101 to 104 in this embodiment) cannot be covered by the heat pump air-warming operation when the outside air temperature Ta is extremely low, and it is therefore necessary to perform the actions to switch the heat pump air-warming operation to the separate heat source air-warming operation as the outside air temperature Ta falls, and to switch the separate heat source air-warming operation to the heat pump air-warming operation as the outside air temperature Ta rises.

However, with the technique of switching due to only the condition of a different outside air temperature Ta, there is a risk that the switch from the heat pump air-warming operation to the separate heat source air-warming operation will be slow and the indoor temperature Tr will drop when the air-conditioning load (air-warming load) in the rooms (the rooms 101 to 104 in this case) is large, and there is a risk that the switch from the heat pump air-warming operation to the separate heat source air-warming operation will be fast and energy conservation will be impaired when the indoor air-conditioning load (air-warming load) is small. By contrast, it is conceivable to appropriately set the outside air temperature at which the operation will be switched from the heat pump air-warming operation to the separate heat source air-warming operation in accordance with factors such as the installation conditions of the air conditioning system 1, but this setting would not be easy and the number of working man-hours would increase.

In view of this, to make the switch timing more appropriate and enable the comfort level and the energy conservation to be improved when the operation is switched from the heat pump air-warming operation to the separate heat source air-warming operation, when the outside air temperature Ta reaches the first switching outside air temperature Tas1 and the first switching condition of the air-warming capability of the heat pump section 60 reaching the upper limit is met while the heat pump air-warming operation is being performed, the operation is switched from the heat pump air-warming operation to the separate heat source air-warming operation.

Figure 4:
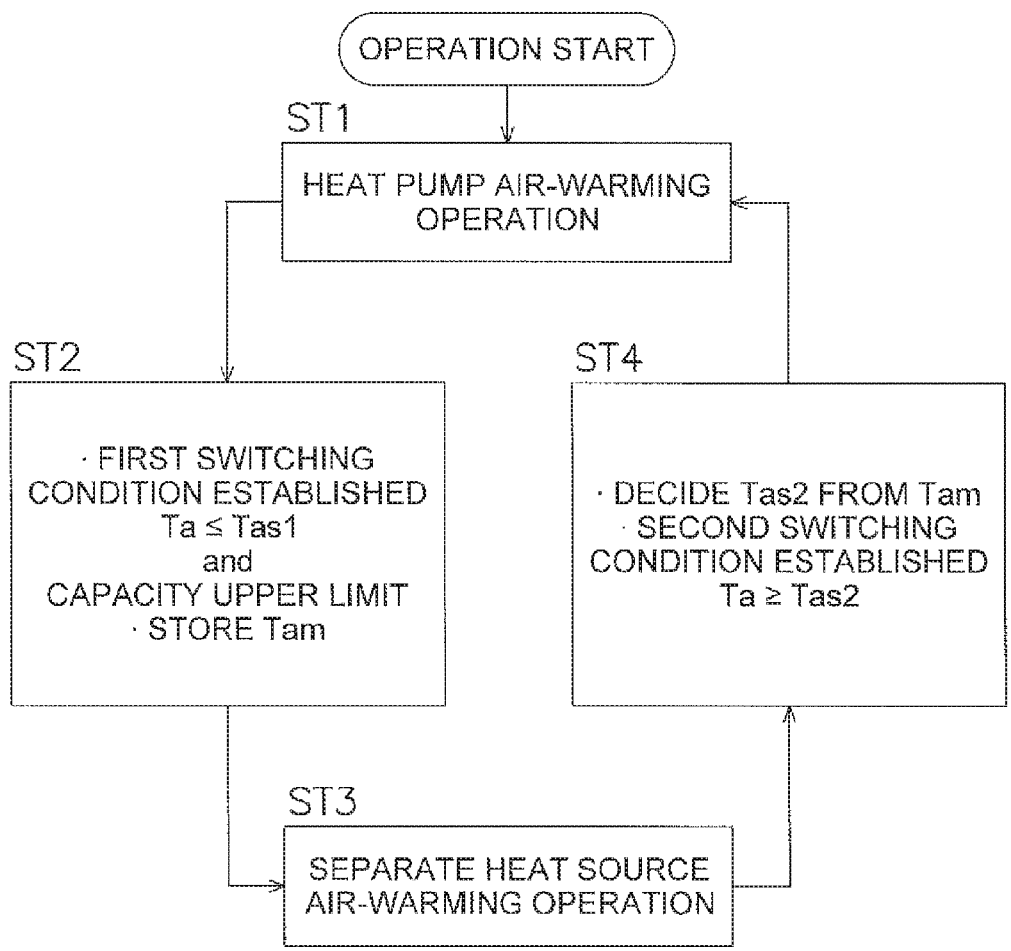
FIG. 4 is a flowchart showing actions of switching between a heat pump air-warming operation and a separate heat source air-warming operation.

Next, FIGS. 1 to 4 are used to describe the action of switching between the heat pump air-warming operation and the separate heat source air-warming operation, including the switch from the heat pump air-warming operation to the separate heat source air-warming operation according to the first switching condition. FIG. 4 is a flowchart showing the action of switching between the heat pump air-warming operation and the separate heat source air-warming operation. The action of switching between the heat pump air-warming operation and the separate heat source air-warming operation is performed by the control unit 8.

Specifically, first, when the operation of the air conditioning system 1 starts, the heat pump air-warming operation of step ST1 is performed. During the heat pump air-warming operation of step ST1, a determination is made as to whether or not the first switching condition of step ST2 is met. This first switching condition is a condition for determining whether or not to switch from the heat pump air-warming operation to the separate heat source air-warming operation. In this embodiment, this condition is that the outside air temperature Ta during the heat pump air-warming operation is equal to or less than the first switching outside air temperature Tas1, and the air-warming capability of the heat pump section 60 reaches the upper limit, as described above. In this embodiment, whether or not the air-warming capability of the heat pump section 60 has reached the upper limit is determined according to whether or not the temperature difference $\Delta Tr$, resulting from subtracting the target indoor temperature Trs from the indoor temperature Tr, is equal to or greater than a first switching indoor temperature difference $\Delta Trs1$, and whether or not the operating capacity of the device configuring the heat pump section 60 has reached an upper limit. In this embodiment, whether or not the operating capacity of the device configuring the heat pump section 60 has reached the upper limit is determined according to whether or not the operating capacity Gr of the compressor 21 (e.g., the rotational speed of the compressor motor 22) has reached an upper limit capacity Grs1 (e.g., an upper limit rotational speed), and/or whether or not the opening degree MV of the outdoor expansion valve 24 has reached an upper limit opening degree MVs1. Whether or not the operating capacity of the heat pump section 60 has reached the upper limit may be determined according to the operating capacity of devices other than the compressor 21 and/or the outdoor expansion valve 24. Additionally, the air-warming capability Qa of the heat pump section 60 may be calculated from the temperature Trd of indoor air that has been heated by the indoor heat exchanger 42 as a refrigerant heat-radiator, and the flow rate Ga of indoor air supplied into the rooms (the rooms 101 to 104 in this case) by the indoor air blower 40. In this embodiment, the amount of heat exchanged in the indoor heat exchanger 42 (i.e., the air-warming capability Qa of the heat pump section 60) may be calculated by subtracting the temperature Tr of the indoor air before the air is heated by the indoor heat exchanger 42 as a refrigerant heat-radiator from the temperature Trd of indoor air after the air is heated by the indoor heat exchanger 42 as a refrigerant heat-radiator, and multiplying the resulting temperature difference by the indoor air flow rate Ga calculated from parameters such as the rotational speed of the indoor fan motor 44 of the indoor air blower 40, and whether or not this air-warming capability Qa has reached an upper limit value Qas1 may be determined.

Thus, in this embodiment, when the operation switches from the heat pump air-warming operation to the separate heat source air-warming operation as described above, it is possible to take into account not only the outside air temperature Ta, but also whether or not the air-warming capability of the heat pump section 60 has reached an upper limit. Additionally, in this embodiment, the determination of whether or not the air-warming capability of the heat pump section 60 has reached an upper limit is made on the basis of the indoor temperature Tr and the operating capacity of the devices (the compressor 21 and/or the outdoor expansion valve 24 in this case configuring the heat pump section 60.

When it is determined in step ST2 that the first switching condition is met, the sequence transitions to the process of step ST3, i.e., the operation switches from the heat pump air-warming operation to the separate heat source air-warming operation. At this time, the outside air temperature Tam when the first switching condition is met in step ST2, i.e., when the operation is switched from the heat pump air-warming operation to the separate heat source air-warming operation, is stored in the memory of the control unit 8. When it is determined in step ST2 that the first switching condition is not met, the heat pump air-warming operation of step ST1 is continued.

The comfort level and the energy conservation can thereby be improved by switching from the heat pump air-warming operation to the separate heat source air-warming operation at the appropriate timing. It is also possible to appropriately determine whether or not the air-warming capability of the heat pump section 60 has reached the upper limit.

Next, in the separate heat source air-warming operation of step ST3, a determination is made as to whether or not the second switching condition of step ST4 is met. This second switching condition is a condition for determining whether or not to switch from the separate heat source air-warming operation to the heat pump air-warming operation. In this embodiment, the condition is that the outside air temperature Ta during the separate heat source air-warming operation is equal to or greater than a second switching outside air temperature Tas2. In this embodiment, the second switching outside air temperature Tas2 is decided on the basis of the outside air temperature Tam (stored in the memory of the control unit 8) when the first switching condition is met in step ST2, i.e., when the switch is made from the heat pump air-warming operation to the separate heat source air-warming operation. Specifically, this temperature is a value obtained by adding a predetermined temperature $\Delta Ta$ to the outside air temperature Tam when the switch is made from the heat pump air-warming operation to the separate heat source air-warming operation.

Thus, in this embodiment, the second switching outside air temperature Tas2 when the switch is made from the separate heat source air-warming operation to the heat pump air-warming operation is decided on the basis of the outside air temperature Tam, which takes into account whether or not the air-warming capability of the heat pump section 60 has reached the upper limit, and this temperature is used when a switch is made from the separate heat source air-warming operation to the heat pump air-warming operation.

When it is determined in step ST4 that the second switching condition is met, the sequence transitions to the process of ST1, i.e., the operation switches from the separate heat source air-warming operation to the heat pump air-warming operation. When it is determined in step ST4 that the second switching condition is not met, the separate heat source air-warming operation of step ST3 is continued.

It is thereby possible in this embodiment for the operation to be switched from the separate heat source air-warming operation to the heat pump air-warming operation at the appropriate timing, and for the comfort level and the energy conservation to be improved.

(4) Modifications

<A>

In the above embodiment, the first switching outside air temperature Tas1 used during a switch from the heat pump air-warming operation to the separate heat source air-warming operation is a fixed value, but the invention is not limited to this arrangement.

Figure 5:
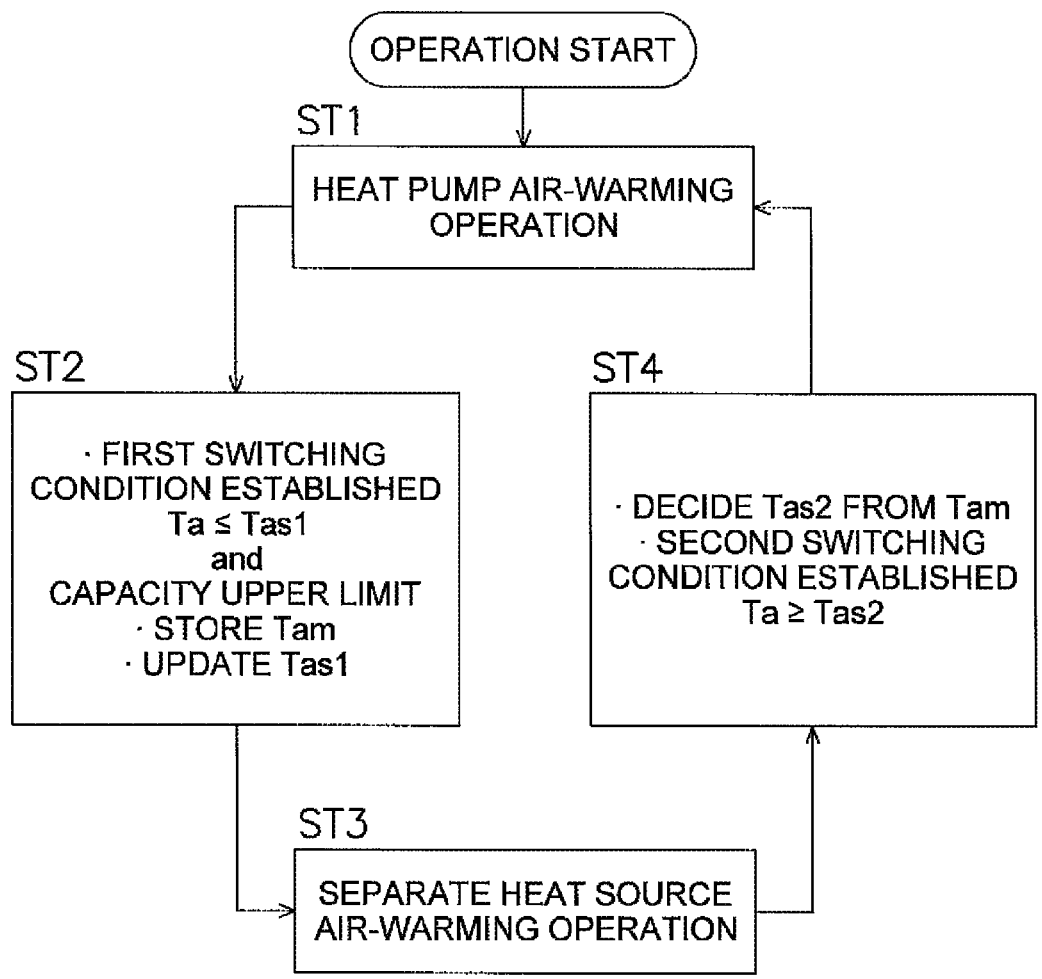
FIG. 5 is a flowchart showing the actions of switching between the heat pump air-warming operation and the separate heat source air-warming operation, according to Modification <A>.

For example, when the control unit 8 stores the outside air temperature Tam used during a switch from the heat pump air-warming operation to the separate heat source air-warming operation in step ST2 as shown in FIG. 5, the first switching outside air temperature Tas1 may be updated by being replaced with the outside air temperature Tam, and may be used the next time it is determined whether or not the first switching condition is met.

Thus, in this modification, the first switching outside air temperature Tas1 used when a switch is made from the heat pump air-warming operation to the separate heat source air-warming operation can be updated to the outside air temperature Tam which takes into account whether or not the air-warming capability of the heat pump section 60 has reached the upper limit in step ST2, and the updated first switching outside air temperature can be used during the next switch from the heat pump air-warming operation to the separate heat source air-warming operation.

In this modification, the first switching outside air temperature Tas1 used in the switch from the heat pump air-warming operation to the separate heat source air-warming operation can thereby be set to an appropriate value that takes into account the installation conditions and/or operating circumstances of the air conditioning system 1.

<B>

In the above embodiment and the modification thereof, the condition that the air-warming capability of the heat pump section 60 reaches an upper limit is added to the condition that the outside air temperature Ta be equal to or less than the first switching outside air temperature Tas1 as the first switching condition for switching from the heat pump air-warming operation to the separate heat source air-warming operation, but the invention is not limited to this arrangement alone.

Figure 6:
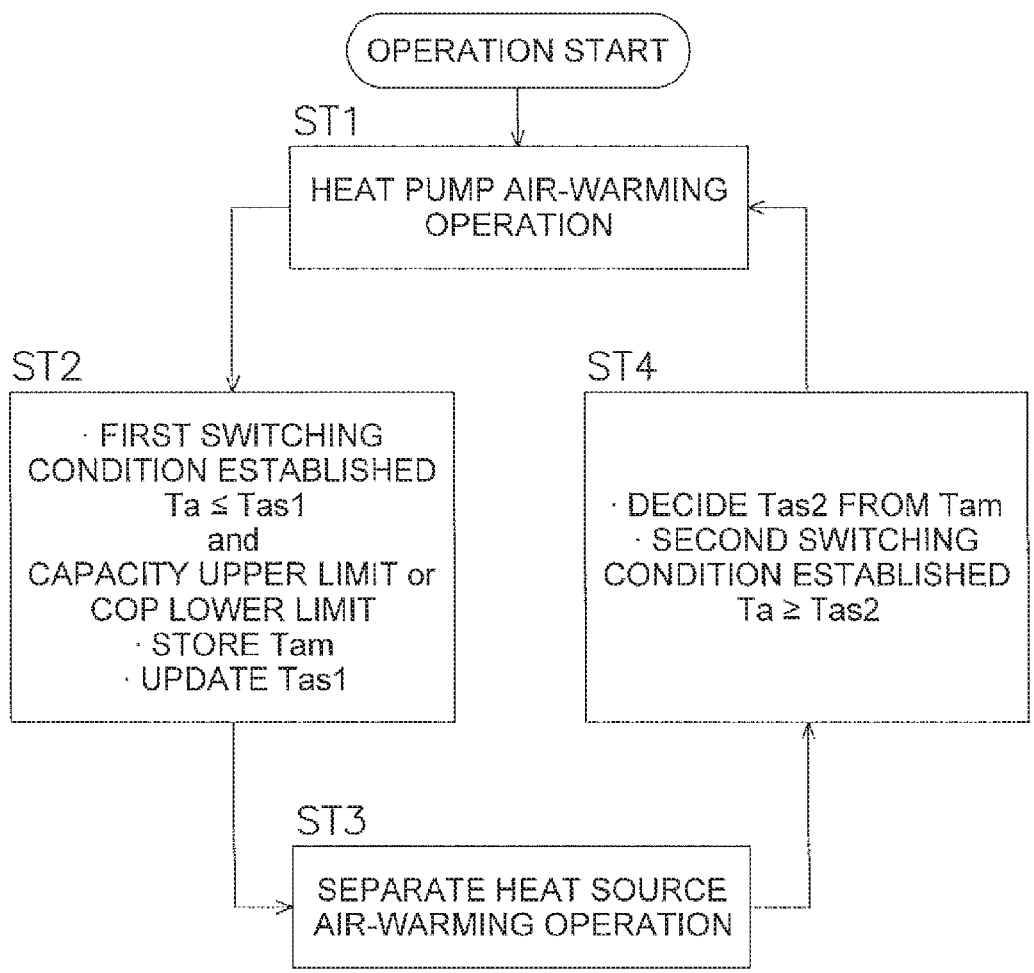
FIG. 6 is a flowchart showing the actions of switching between the heat pump air-warming operation and the separate heat source air-warming operation, according to Modification <B>.

For example, the control unit 8 may determine in step ST2 that the first switching condition is met when the outside air temperature Ta reaches the first switching outside air temperature Tas1 and a coefficient of performance COP of the heat pump section 60 reaches a lower limit, as shown in FIG. 6. In this modification, various methods are conceivable for calculating the coefficient of performance COP, but, for example, the air-warming capability Qa of the heat pump section 60 can be obtained from the temperature Trd of the air heated by the indoor heat exchanger 42 as a refrigerant heat-radiator and from the flow rate Ga of air supplied into the rooms (the rooms 101 to 104 in this case) by the indoor air blower 40, the coefficient of performance COP of the heat pump section 60 can be calculated by dividing this air-warming capability Qa by the power consumption Wc of the compressor 21, and whether or not the coefficient of performance COP has reached a lower limit valve COPas1 can be determined. In FIG. 6, the determination of whether or not the coefficient of performance COP has reached a lower limit is added in the switching action of Modification A (see FIG. 5), but the determination of whether or not the coefficient of performance COP has reached a lower limit may also be added in the switching action of the above embodiment (see FIG. 4).

Thus, in this modification, whether or not the coefficient of performance COP of the heat pump section 60 has reached a lower limit can also be taken into account when the operation is switched from the heat pump air-warming operation to the separate heat source air-warming operation.

It is thereby possible in this modification for the operation to be switched from the heat pump air-warming operation to the separate heat source air-warming operation at a timing that takes the operating efficiency of the heat pump section 60 into account.

<C>

In the above embodiment and the modifications thereof, when the outside air temperature Ta is either extremely low or extremely high, it is preferable that a switch between the heat pump air-warming operation and the separate heat source air-warming operation be made without determining whether or not the first switching condition of step ST2 is met or whether or not the second switching condition of step ST4 is met.

Figure 7:
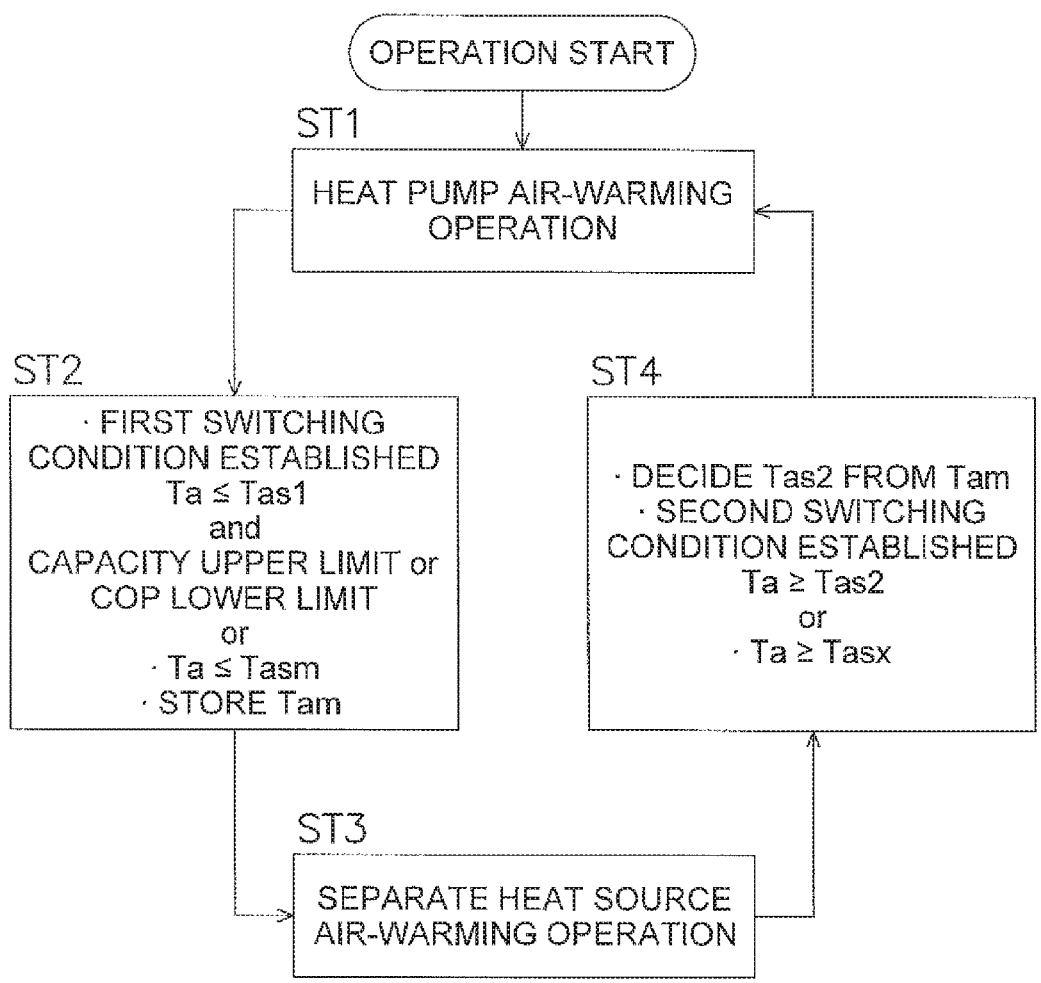
FIG. 7 is a flowchart showing the actions of switching between the heat pump air-warming operation and the separate heat source air-warming operation, according to Modification <C>.

In view of this, in this modification, when the outside air temperature Ta in step ST2 is equal to or less than a first switching lower limit outside air temperature Tasm which is lower than the first switching outside air temperature Tas1 in the first switching condition, a switch is made from the heat pump air-warming operation to the separate heat source air-warming operation without determining whether or not the first switching condition is met, as shown in FIG. 7. In this modification, the first switching lower limit outside air temperature Tasm is set to a temperature value sufficiently lower than the outside air temperature predicted as the first switching outside air temperature Tas1. In step ST4, when the outside air temperature Ta is equal to or greater than a second switching upper limit outside air temperature Tasx which is higher than the second switching outside air temperature Tas2 in the second switching condition, a switch is made from the separate heat source air-warming operation to the heat pump air-warming operation without determining whether or not the second switching condition is met. In this modification, the second switching upper limit outside air temperature Tasx is set to a temperature value sufficiently higher than the outside air temperature predicted as the second switching outside air temperature Tas2. In FIG. 7, the determination of whether or not the outside air temperature is equal to or less than the first switching lower limit outside air temperature Tasm or the determination of whether or not the outside air temperature is equal to or greater than the second switching upper limit outside air temperature Tasx is added in the switching action of the above embodiment see FIG. 4), but the determination of whether or not the outside air temperature is equal to or less than the first switching lower limit outside air temperature Tasm or the determination of whether or not the outside air temperature is equal to or greater than the second switching upper limit outside air temperature Tasx may also be added in the switching actions of Modifications A and B (see FIGS. 5 and 6).

<D>

In the above embodiment and the modifications thereof, the gas furnace unit 5 configuring the separate heat source section 70 (i.e., the furnace heat exchanger 55 as a separate heat source heat-radiator) is disposed on the upwind side of the indoor unit 4 configuring the heat pump section 60 (i.e., the indoor heat exchanger 42 as a refrigerant heat-radiator) within the usage unit 3, but the present invention is not limited to this arrangement.

Figure 8:
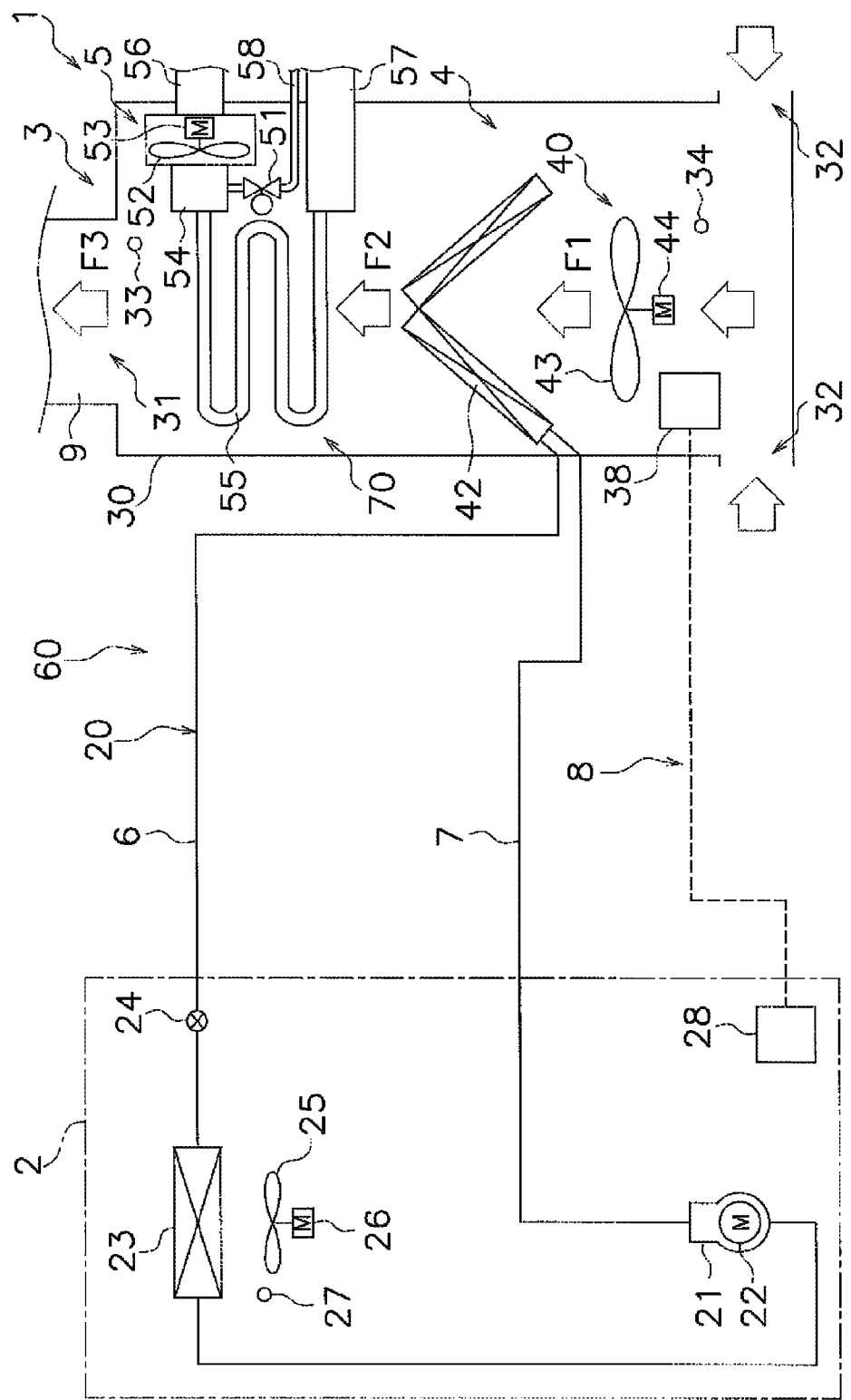
FIG. 8 is a simplified configuration diagram of the air conditioning system according to Modification <D>.

For example, the gas furnace unit 5 as the separate heat source section 70 (i.e., the furnace heat exchanger 55 as a separate heat source heat-radiator) may be disposed on the downwind side of the indoor unit 4 as the heat pump section 60 (i.e., the indoor heat exchanger 42 as a refrigerant heat-radiator), as shown in FIG. 8.

<E>

In the above embodiment and the modifications thereof, the gas furnace unit 5 configuring the separate heat source section 70 and the indoor unit 4 configuring the heat pump section 60 are configured as an integrated usage unit 3, but the present invention is not limited to this arrangement.

Figure 9:
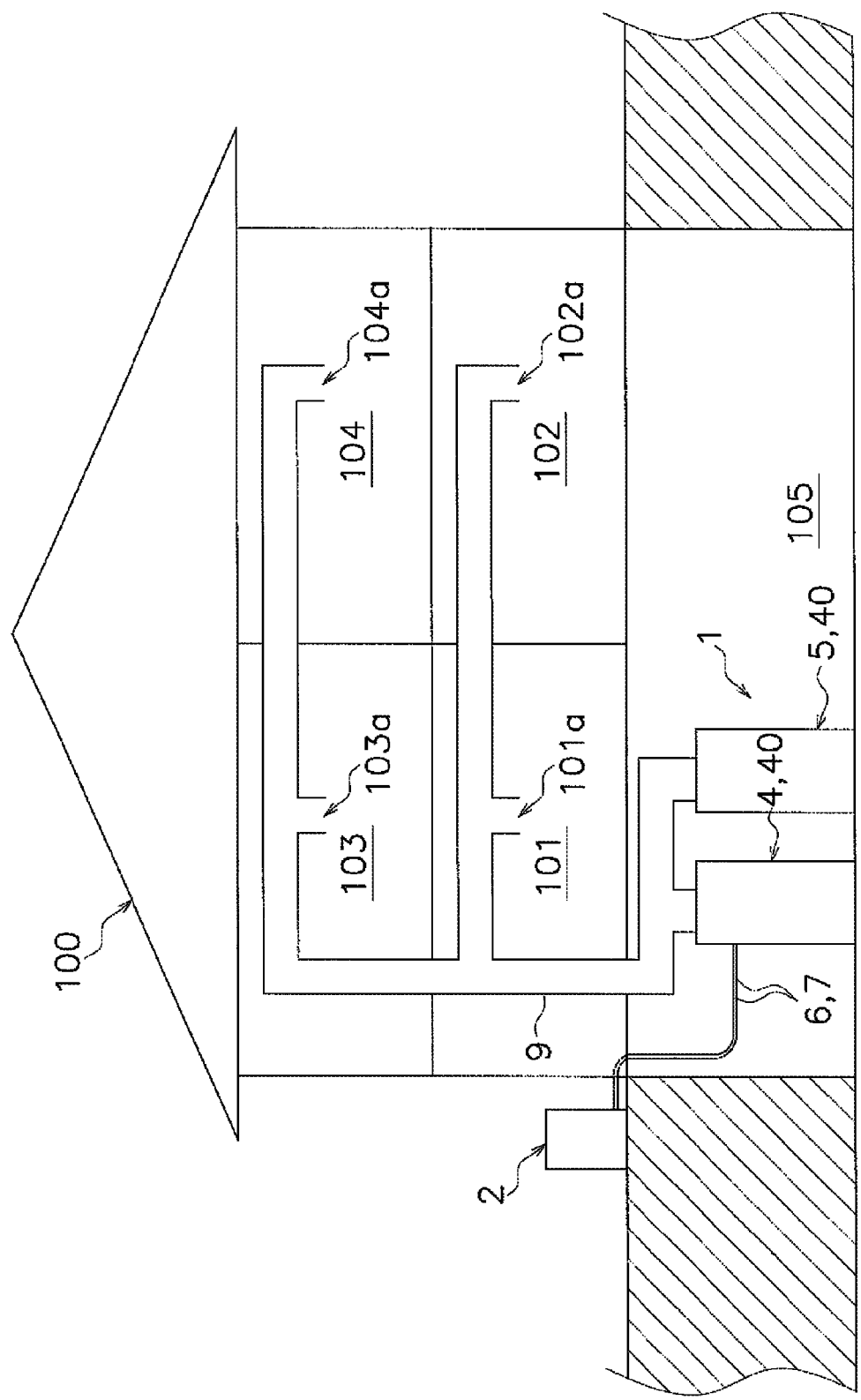
FIG. 9 is a schematic diagram showing the arrangement of the air conditioning system according to Modification <E>.
Figure 10:
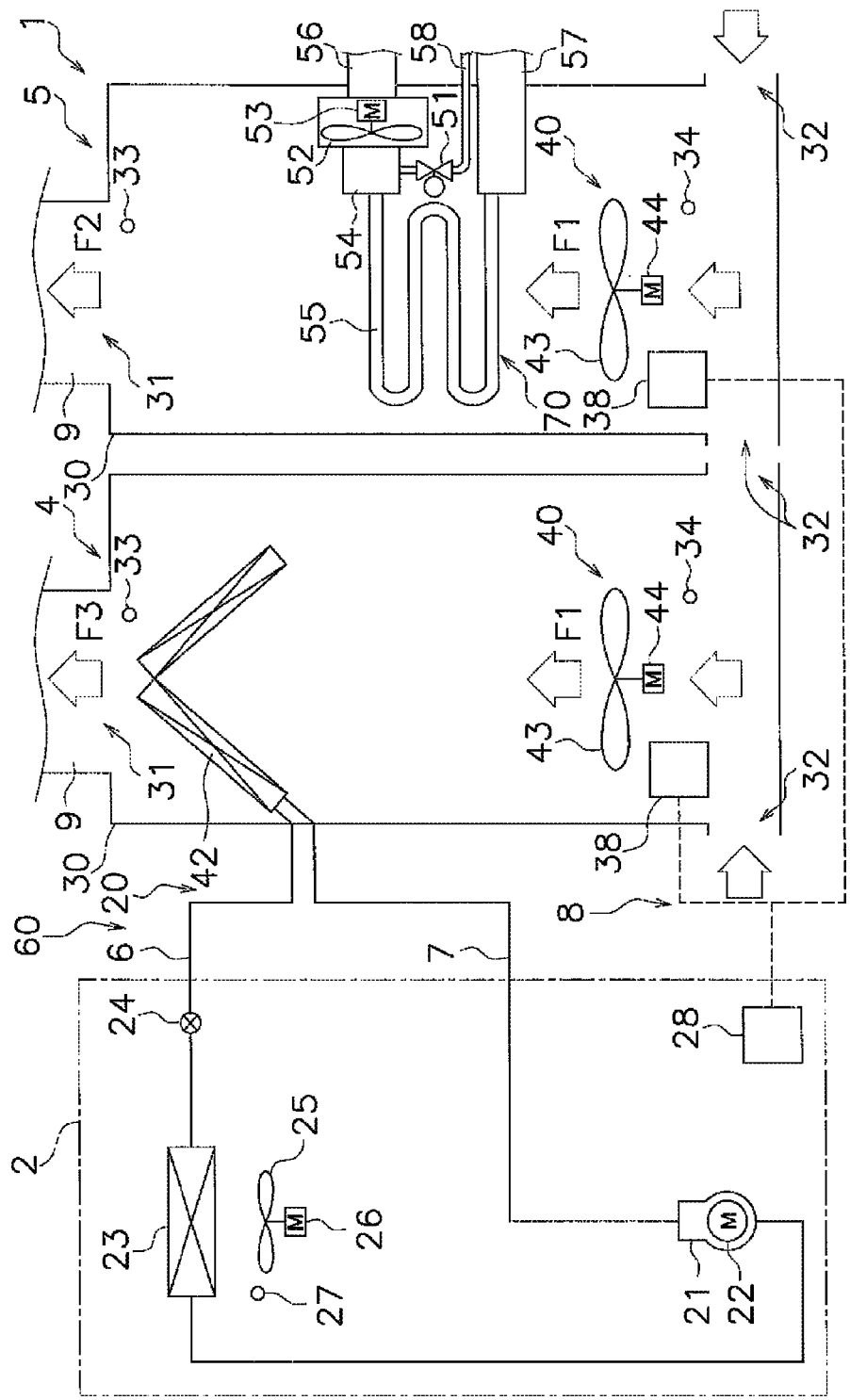
FIG. 10 is a simplified configuration diagram of the air conditioning system according to Modification <E>.

For example, the gas furnace unit 5 configuring the separate heat source section 70 and the indoor unit 4 configuring the heat pump section 60 may be arranged separately as shown in FIGS. 9 and 10. In this case, the indoor air blower 40 and other various devices and/or sensors that had been shared between the gas furnace unit 5 and the indoor unit 4 in the above embodiment and the modifications thereof must be provided to both the gas furnace unit 5 and the indoor unit 4.

<F>

In the above embodiment and the modifications thereof, a single usage unit 3 (indoor unit 4) is connected to the outdoor unit 2, but the present invention is not limited to this arrangement.

Figure 11:
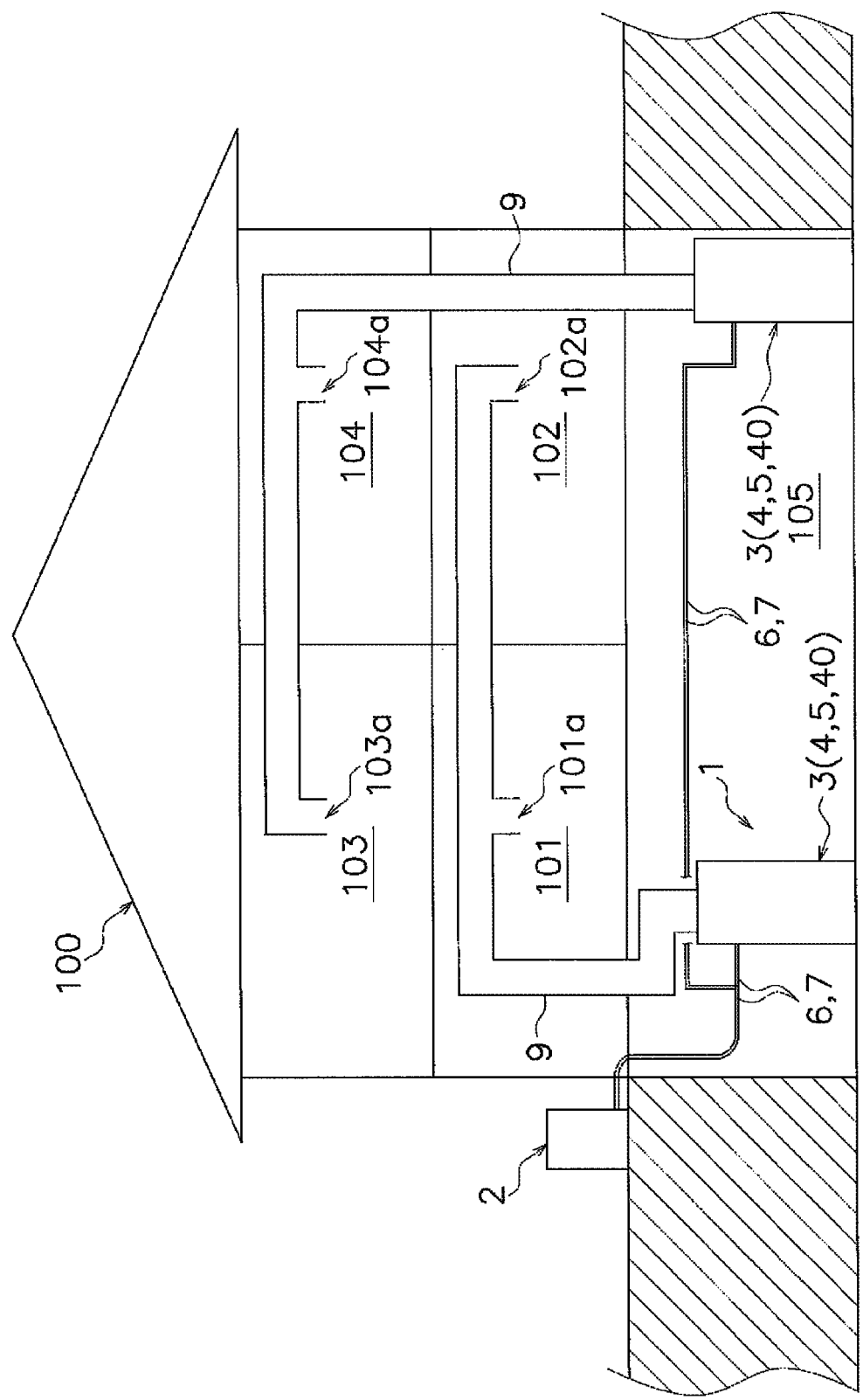
FIG. 11 is a schematic diagram showing the arrangement of the air conditioning system according to Modification <F>.
Figure 12:
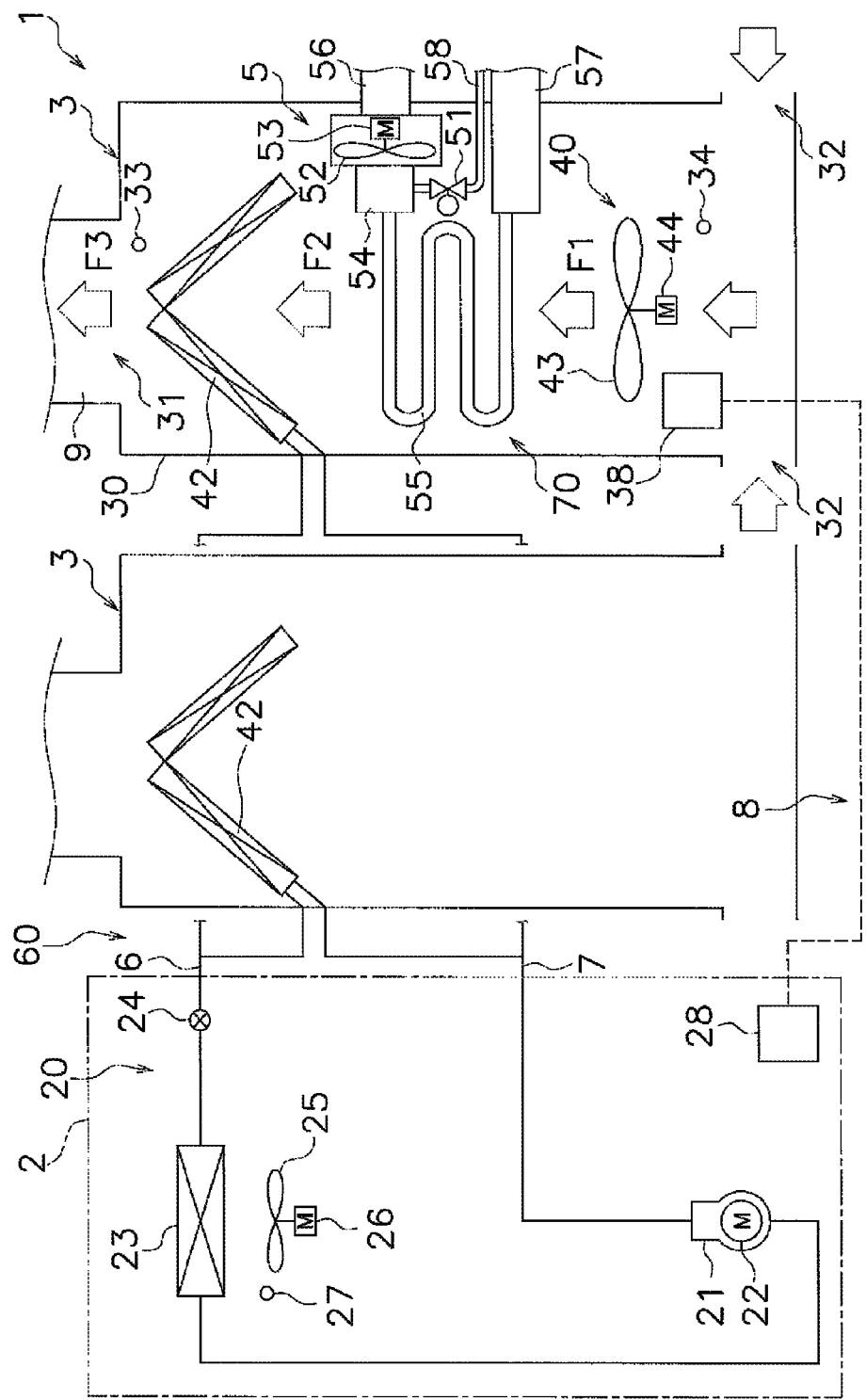
FIG. 12 is a simplified configuration diagram of the air conditioning system according to Modification <F>.

For example, a plurality (two in this modification) of usage units 3 (indoor units 4) may be connected to the outdoor unit 2 via the refrigerant interconnection pipes 6, 7, one usage unit 3 may be used to air-condition the rooms 103, 104, and the other usage unit 3 may be used to air-condition the rooms 101, 102, as shown in FIGS. 11 and 12. In FIG. 12, the details of one usage unit 3 are illustrated, and for the other usage unit 3, only the indoor heat exchanger 42 as a refrigerant heat-radiator configuring the heat pump section 60 is illustrated. When a configuration is employed in which a plurality of usage units 3 are connected to the outdoor unit 2, rather than being provided in the basement 105, the corresponding usage units 3 may be provided in the rooms they are used to air-condition or in proximity thereto. When usage units 3 corresponding to the rooms 101 to 104 are provided, rather than being duct-type units, the usage units 3 may be installed as being placed on the floors, mounted on the walls, installed on the ceilings, or the like of the rooms 101 to 104. When usage units 3 are provided to the rooms 101 to 104, gas furnace units 5 configuring separate heat source sections 70 and indoor units 4 configuring heat pump sections 60 may be placed separately for the different rooms, similar to Modification E.

<G>

In the above embodiment and the modifications thereof, the heat pump section 60 has a refrigerant circuit 20 solely for air-warming, but a four-way switching valve or the like may be provided to the refrigerant circuit 20 to enable switching the refrigerant circulation direction, and the configuration may be enabled for an air-cooling operation.

<H>

In the above embodiment and the modifications thereof, a gas furnace unit 5 which uses the combustion of fuel gas as a heat source is employed as the separate heat source section 70, but the present invention is not limited to this arrangement. For example, anything that has a separate heat source from the heat pump section 60, such as a hot water boiler or an electric heater, can be employed as the separate heat source section 70.

INDUSTRIAL APPLICABILITY

The present invention is widely applicable to an air conditioning system that has a heat pump section for performing indoor air-warming by using a vapor-compression refrigeration cycle, and a separate heat source section for performing indoor air-warming by using a heat source separate from the heat pump section.

What is claimed is:

1. An air conditioning system, comprising:
   a heat pump section arranged and configured to perform indoor air-warming by using a vapor-compression refrigeration cycle;
   a separate heat source section arranged and configured to perform indoor air-warming by using a heat source separate from the heat pump section; and
   a control unit configured to control actions of the heat pump section and the separate heat source section,
   the control unit, when a heat pump air-warming operation is being performed in which indoor air-warming is performed by the heat pump section, and when a first switching condition is met, switching from the heat pump air-warming operation to a separate heat source air-warming operation in which indoor air-warming is performed by the separate heat source section,
   the first switching condition being that an outside air temperature reaches a first switching outside air temperature and an air-warming capability of the heat pump section reaches an upper limit,
   the control unit being further configured to decide a second switching outside air temperature as a second switching condition in order to switch from the separate heat source air-warming operation to the heat pump air-warming operation, based on the outside air temperature when an operation is switched from the heat pump air-warming operation to the separate heat source air-warming operation, and
   the control unit being further configured to determine whether the air-warming capability of the heat pump section has reached the upper limit or not based on an indoor temperature and an operating capacity of a device configuring the heat pump section.

2. The air conditioning system according to claim 1, wherein
   the control unit is further configured to store the outside air temperature used when the operation is switched from the heat pump air-warming operation to the separate heat source air-warming operation and to update the first switching outside air temperature, and
   the control unit is further configured to use an updated first switching outside air temperature when next determining whether or not the first switching condition is met.

3. The air conditioning system according to claim 2, wherein
the control unit is further configured to determine that the air-warming capability of the heat pump section has reached the upper limit when
a temperature difference resulting from subtracting a target indoor temperature from an indoor temperature is equal to or greater than a first switching indoor temperature difference and
an operating capacity of a device configuring the heat pump section has reached an upper limit.

4. The air conditioning system according to claim 3, wherein
the control unit is further configured to determine that the first switching condition is met also when
the outside air temperature has reached the first switching outside air temperature and
a coefficient of performance of the heat pump section has reached a lower limit.

5. The air conditioning system according to claim 2, wherein
the control unit is further configured to determine that the first switching condition is met also when
the outside air temperature has reached the first switching outside air temperature and
a coefficient of performance of the heat pump section has reached a lower limit.

6. The air conditioning system according to claim 1, wherein
the control unit is further configured to determine that the air-warming capability of the heat pump section has reached the upper limit when
a temperature difference resulting from subtracting a target indoor temperature from an indoor temperature is equal to or greater than a first switching indoor temperature difference and
an operating capacity of a device configuring the heat pump section has reached an upper limit.

7. The air conditioning system according to claim 6, wherein
the control unit is further configured to determine that the first switching condition is met also when
the outside air temperature has reached the first switching outside air temperature and
a coefficient of performance of the heat pump section has reached a lower limit.

8. The air conditioning system according to claim 1, wherein
the control unit is further configured to determine that the first switching condition is met also when
the outside air temperature has reached the first switching outside air temperature and
a coefficient of performance of the heat pump section has reached a lower limit.

* * * * *